US011921242B2

(12) United States Patent
Ruggiero et al.

(10) Patent No.: US 11,921,242 B2
(45) Date of Patent: Mar. 5, 2024

(54) METHOD AND DEVICE FOR TIME-OF-FLIGHT ESTIMATE

(71) Applicant: STMICROELECTRONICS S.r.l., Agrate Brianza (IT)

(72) Inventors: Davide Ruggiero, S. Agata de Goti (IT); Rosario Schiano Lo Moriello, Agrate Brianza (IT); Annalisa Liccardo, Agrate Brianza (IT); Giuseppe Caiazzo, Corsico (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 104 days.

(21) Appl. No.: 17/506,554

(22) Filed: Oct. 20, 2021

(65) Prior Publication Data
US 2022/0120883 A1    Apr. 21, 2022

(30) Foreign Application Priority Data

Oct. 21, 2020   (IT) ........................ 102020000024874

(51) Int. Cl.
*G01S 7/527* (2006.01)
*G01S 15/10* (2006.01)
*G06F 17/14* (2006.01)

(52) U.S. Cl.
CPC .......... *G01S 7/5273* (2013.01); *G01S 15/101* (2013.01); *G06F 17/14* (2013.01)

(58) Field of Classification Search
CPC .... G01S 7/5273; G01S 15/101; G01S 15/102; G01S 7/526; G01S 15/08; G01S 7/539; G06F 17/14
See application file for complete search history.

(56) References Cited

U.S. PATENT DOCUMENTS

2014/0204700 A1    7/2014  Valero et al.
2022/0120883 A1*   4/2022  Ruggiero .............. G01S 15/101

FOREIGN PATENT DOCUMENTS

| CN | 111149141 A  | * | 5/2020 | .......... G05D 1/0287 |
| CN | 114384527 A  | * | 4/2022 | .......... G01S 15/101 |
| EP | 3988964 A1   | * | 4/2022 | .......... G01S 15/101 |

OTHER PUBLICATIONS

Angrisani, L. et al., "Ultrasonic Time-of-Flight Estimation Through Unscented Kalman Filter," *IEEE Transactions on Instrumentation and Measurement*, vol. 55, No. 4, Aug. 2006, p. 1077-1084.

\* cited by examiner

*Primary Examiner* — Daniel Pihulic
(74) *Attorney, Agent, or Firm* — Seed IP Law Group LLP

(57) ABSTRACT

A method for providing an estimate of a time-of-flight between an ultrasonic signal emitted by a device and an ultrasonic echo signal returned by a target object hit by the ultrasonic signal and received at the device. The method includes acquiring the ultrasonic echo signal thereby obtaining an electric echo signal; determining a noise power of the electric echo signal; determining an envelope signal indicative of an envelope of the electric echo signal; determining a portion of the envelope signal based on at least one operative parameter, the at least one operative parameter being determined according to Particle Swarm Optimization; processing the portion of the envelope signal and the noise power of the echo ultrasonic signal according to an Unscented Kalman Filter to obtain an estimate of the envelope signal, wherein the estimate of the envelope signal is a regenerated version of the envelope signal being regenerated from the portion of the envelope signal, the processing being based on at least one Unscented Kalman Filter parameter determined according to the Particle Swarm Optimization, (Continued)

and providing the estimate of the time-of-flight according to the estimate of the envelope signal.

19 Claims, 5 Drawing Sheets

METHOD AND DEVICE FOR TIME-OF-FLIGHT ESTIMATE

BACKGROUND

Technical Field

The present disclosure relates to a device for ultrasonic time-of-flight (TOF) estimate (hereinafter, TOF device) and a corresponding method implemented by the TOF device.

Description of the Related Art

According to ultrasonic TOF estimate principles, an ultrasonic signal (hereinafter, ultrasonic source signal) is generated and transmitted by the TOF device towards a target body, a corresponding ultrasonic signal (hereinafter, ultrasonic echo signal) originated from the target body by reflection of the ultrasonic source signal hitting the target body is received at the TOF device, and the TOF estimate is determined as the time elapsed from the transmission of the ultrasonic source signal and the reception of the ultrasonic echo signal.

In typical applications, e.g., in applications for obstacle detection, the TOF device may be configured to determine, e.g., based on the TOF estimate, a distance estimate indicative of a distance between the TOF device and the target body.

The output of the TOF device may be the distance estimate, and/or the distance estimate may be part of an additional information based on the distance estimate, such as displacement information, level information, material information, structure information, vibration information, and medical diagnostic information.

According to a known implementation, the TOF estimate is based on Kalman Filter, which is an algorithm that, given a set of measures, generates an optimal estimate of desired quantities through a recursive processing.

Extended Kalman Filter is also known, which applies to non-linear systems. Basically, the Extended Kalman Filter provides for a linearization of a non-linear system through Jacobian computation.

Unscented Kalman Filter is also known, which also applies to non-linear systems. Basically, the Unscented Kalman Filter provides for a linearization of probabilistic distributions of an error.

Nowadays, TOF estimate based on the Unscented Kalman Filter is a preferred choice.

BRIEF SUMMARY

The Applicant has understood that TOF estimate based on the Unscented Kalman Filter has some drawbacks.

For example, the Applicant has understood that the performances of the Unscented Kalman Filter are closely related to an efficient calibration of a large number of parameters (including parameters associated with an acquisition of the ultrasonic echo signal and parameters of the Unscented Kalman Filter).

Due to the large number of parameters to be calibrated and since the calibration of these parameters is almost always done by hand according to designer experience, the performances of the Unscented Kalman Filter may often be below expectations.

Moreover, the Applicant has also understood that, during TOF device lifetime, the TOF estimates may also be affected by external conditions (such as environmental conditions). For example, changes in air temperature, humidity, air pressure, air turbulence, external noise may heavily affect an ultrasonic signal acquisition, so that parameter calibration could result inadequate as a result of changed external conditions.

Last but not least, the Applicant has understood that high computational complexity of current TOF estimate methods does not allow efficient implementation in available microcontrollers.

The Applicant has faced the above-mentioned issues, and has devised a method for TOF estimate and a corresponding TOF device that allows easily and dynamically tuning (i.e., adjusting or updating or refining or calibrating) the parameters associated with the processing of the acquired ultrasonic echo signal and the parameters of the Unscented Kalman Filter.

For example, an aspect of the present disclosure relates to a method for providing an estimate of a time-of-flight between an ultrasonic signal emitted by a device and an ultrasonic echo signal returned by a target object hit by the ultrasonic signal and received at the device. The method may comprise acquiring the ultrasonic echo signal thereby obtaining an electric echo signal. The method may comprise determining a noise power of the electric echo signal. The method may comprise determining an envelope signal indicative of an envelope of the electric echo signal. The method may comprise determining a portion of the envelope signal based on at least one operative parameter; said at least one operative parameter may be determined according to Particle Swarm Optimization. The method may comprise processing the portion of the envelope signal and the noise power of the echo ultrasonic signal according to an Unscented Kalman Filter to obtain an estimate of the envelope signal; the estimate of the envelope signal may be a regenerated version of the envelope signal being regenerated from the portion of the envelope signal; said processing may for example be based on at least one Unscented Kalman Filter parameter ($UKFP_K$) determined according to the Particle Swarm Optimization. The method may comprise providing said estimate of the time-of-flight according to the estimate of the envelope signal.

According to an embodiment, whose features are additional or alternative to one or more features of any of the previous embodiments, the method comprises determining an estimate error. The Particle Swarm Optimization may be based on said estimate error.

According to an embodiment, whose features are additional or alternative to one or more features of any of the previous embodiments said determining an estimate error comprises determining a difference between the estimate of envelope signal and the envelope signal.

According to an embodiment, whose features are additional or alternative to one or more features of any of the previous embodiments, the method comprises, based on said estimate of the time-of-flight, determining a distance estimate indicative of a distance between the target object and the device. Said determining an estimate error may comprise determining a difference between the distance estimate and said distance.

According to an embodiment, whose features are additional or alternative to one or more features of any of the previous embodiments, said determining an envelope signal comprises performing a Hilbert transformation on the echo ultrasonic signal.

According to an embodiment, whose features are additional or alternative to one or more features of any of the previous embodiments, the portion of the envelope signal is centered about a maximum value of the envelope signal.

According to an embodiment, whose features are additional or alternative to one or more features of any of the previous embodiments, said processing the operative portion of the envelope signal comprises providing a regenerated envelope signal.

According to an embodiment, whose features are additional or alternative to one or more features of any of the previous embodiments, said at least one operative parameter comprises at least one among:
  operative parameters indicative of a maximum length of the portion of the envelope signal over time, and
  operative parameters indicative of an optimized length of the portion of the envelope signal over time, the optimized length being lower than the maximum length.

According to an embodiment, whose features are additional or alternative to one or more features of any of the previous embodiments, said at least one Unscented Kalman Filter parameter comprises at least one among:
  an evaluation parameter providing a rough estimate of the time-of-flight;
  a control parameter for controlling the spread of sigma points around a mean state value, and
  a correction parameter providing a correction on the noise power of the electric echo signal.

Another aspect of the present disclosure relates to a device for providing an estimate of a time-of-flight between an ultrasonic signal emitted by the device and an ultrasonic echo signal returned by a target object hit by the ultrasonic signal and received at the device. The device may comprise a conditioning and conversion system for acquiring the ultrasonic echo signal thereby obtaining an electric echo signal. The device may comprise a module for determining a noise power of the electric echo signal. The device may comprise a module for determining an envelope signal indicative of an envelope of the electric echo signal. The device may comprise a module for determining a portion of the envelope signal based on at least one operative parameter; said at least one operative parameter may be determined according to Particle Swarm Optimization. The device may comprise a module for processing the portion of the envelope signal and the noise power of the echo ultrasonic signal according to an Unscented Kalman Filter to obtain an estimate of the envelope signal; the estimate of the envelope signal may be a regenerated version of the envelope signal being regenerated from the portion of the envelope signal; said processing may be based on at least one Unscented Kalman Filter parameter determined according to the Particle Swarm Optimization. The device may comprise a module for providing said estimate of the time-of-flight according to the estimate of the envelope signal.

A further aspect of the present disclosure relates to an electronic system comprising such a device (or more thereof).

BRIEF DESCRIPTION OF THE SEVERAL VIEWS OF THE DRAWINGS

These and other features and advantages of the present disclosure will be made apparent by the following description of some exemplary and non-limitative embodiments thereof; for its better intelligibility, the following description should be read making reference to the attached drawings, wherein.

DETAILED DESCRIPTION

Figure 1:
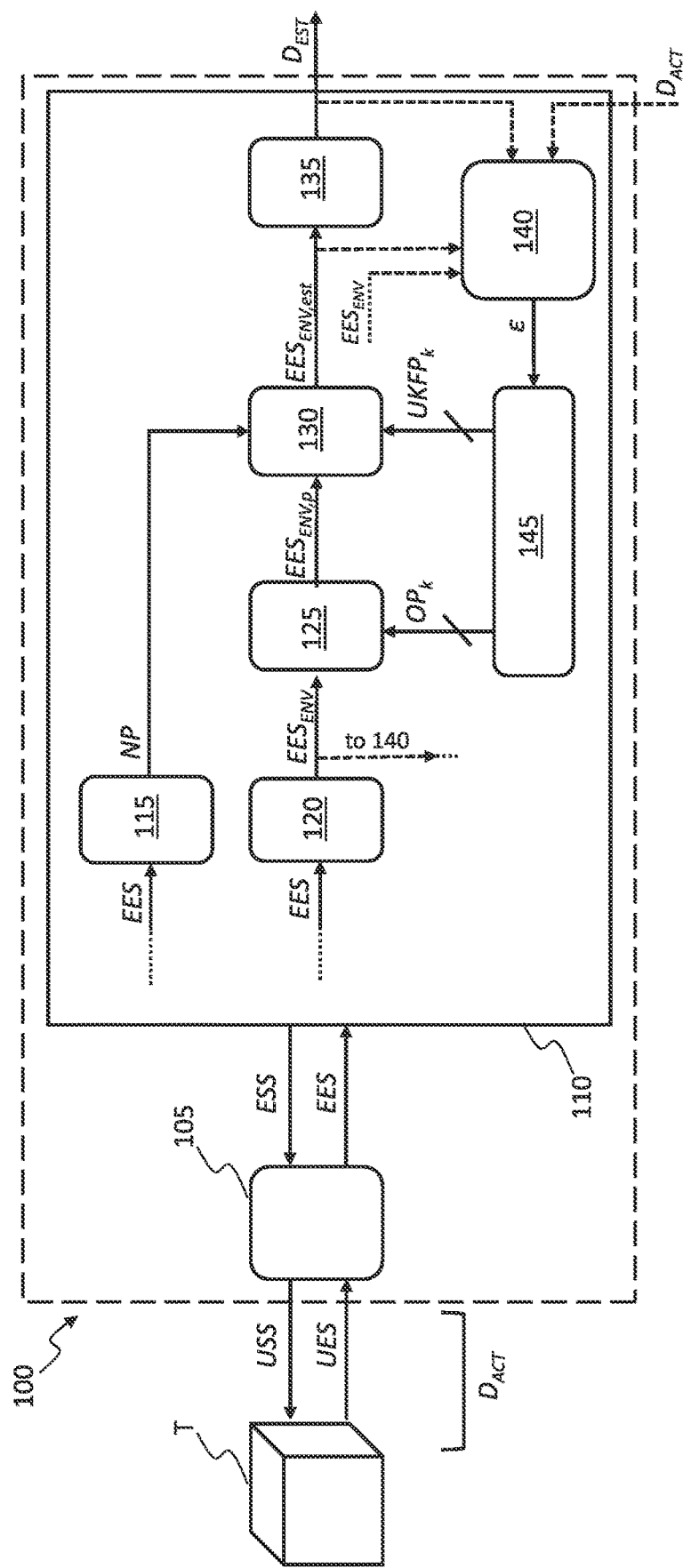
FIG. 1 schematically shows a device for ultrasonic time-of-flight estimate, according to an embodiment of the present disclosure.

With reference to the drawings, FIG. 1 schematically shows a device (hereinafter, TOF device) 100 for providing an ultrasonic time-of-flight estimate (hereinafter, TOF estimate), according to an embodiment of the present disclosure. The TOF device 100 is configured to implement a method (hereinafter, TOF method) for providing the TOF estimate.

In the following, when one or more features of the TOF device and of the TOF method are introduced by the wording "according to an embodiment", they are to be construed as features additional or alternative to any features previously introduced, unless otherwise indicated and/or unless there is evident incompatibility among feature combinations.

In the following, only components of (and TOF method steps performed by) the TOF device 100 deemed relevant for the understanding of the present disclosure will be shown and discussed, with other well-known components of (and TOF method steps performed by) the TOF device 100 that will be intentionally omitted for the sake of conciseness.

According to ultrasonic time-of-flight estimate principles, an ultrasonic signal (hereinafter, ultrasonic source signal) USS is generated and transmitted by the TOF device 100 towards a target body T (the target body being eternal to, i.e., not part of, the TOF device 100), a corresponding ultrasonic signal (hereinafter, ultrasonic echo signal) UES originated from the target body T by reflection of the ultrasonic source signal USS hitting the target body T is received at the TOF device 100, and the TOF estimate is determined (by the TOF device 100) as the time elapsed from the transmission of the ultrasonic source signal USS and the reception of the ultrasonic echo signal UES.

According to an embodiment, the TOF device 100 is configured to determine, e.g., based on the TOF estimate, a distance estimate $D_{EST}$ indicative of a distance $D_{ACT}$ between the TOF device 100 and the target body T.

According to an embodiment, the TOF device 100 may be configured to further determine, e.g., based on the TOF estimate and/or on the distance estimate $D_{EST}$, one or more additional information. According to an embodiment, as better discussed in the following, the TOF device 100 may be part of an electronic system aimed at determining the additional information based on the TOF estimate and/or on the distance estimate $D_{EST}$ provided by the TOF device 100.

Examples of additional information include, but are not limited to, displacement information, level information, material information, structure information, vibration information, and medical diagnostic information.

For the purposes of the present disclosure, the target body T (which is not part of the TOF device 100) comprises a physical object with mass. Examples of target bodies include, but are not limited to, living beings (such as persons, animals and trees) or parts thereof, and inanimate objects (such as buildings and vehicles) or parts thereof.

According to an embodiment, the TOF device 100 comprises an ultrasonic transducer 105. According to an embodiment, the ultrasonic transducer 105 comprises a piezoelectric ultrasonic transducer or a capacitive ultrasonic transducer.

According to an embodiment, the ultrasonic transducer 105 is configured to transduce an electric source signal ESS (e.g., a pulse-width modulated pulse train) into the ultrasonic source signal USS, and to transduce the ultrasonic echo signal UES from the target body T to obtain a corresponding electric echo signal EES.

According to an embodiment, the electric source signal ESS and the electric echo signal EES are digital signals, the ultrasonic transducer 105 for example comprising a conditioning and conversion system (not shown) for obtaining, from the (digital) electric source signal ESS, an analog ultrasonic source signal to be transduced into the electric echo signal EES, and for obtaining the (digital) electric echo signal EES from the transduced ultrasonic echo signal.

According to an embodiment, the TOF device 100 comprises a processing unit 110 (for example, a microcontroller and/or a microprocessor) electrically coupled to the ultrasonic transducer 105 for providing the electric source signal ESS thereto and for receiving the electric echo signal EES therefrom.

In the following, only relevant modules of the processing unit 110 that are deemed pertinent for the understanding of the present disclosure will be discussed, with well-known and/or obvious variants of the relevant modules that are omitted for the sake of conciseness.

The term "module" is herein intended to emphasize functional (rather than implementation) aspects thereof. Indeed, without losing generality, each module, according to its function, may be implemented by software, hardware, and/or a combination thereof. Moreover, the modules (or at least a subset thereof) may also reflect, at least conceptually, the physical structure of the processing unit. In any case, it will be appreciated that one or more of the illustrated modules may be integrated together in a single electronic unit.

According to an embodiment, the processing unit 110 comprises a module 115 for determining a noise power NP (or an indication thereof) associated with the electric echo signal EES.

According to an embodiment, in order to determine the noise power NP (or an indication thereof) associated with the electric echo signal EES, the module 115 is configured to process the electric echo signal EES according to Fourier transform. In the description herein, the module 115 is also referred to as Fourier module 115.

According to an embodiment, the processing unit 110 comprises a module 120 for determining an envelope signal $EES_{ENV}$ indicative of an envelope (e.g., a profile) of the echo ultrasonic signal.

According to an embodiment, in order to determine the envelope signal $EES_{ENV}$, the module 120 is configured to process the electric echo signal EES according to Hilbert transform. In the description herein, the module 120 is also referred to as Hilbert module 120.

Since the frequency of the envelope signal $EES_{ENV}$ is lower than the frequency of the electric echo signal EES, the envelope signal $EES_{ENV}$ can be appropriately decimated in terms of sample/s without violating Nyquist requests. Thus, the Hilbert module 120 performs a first signal "dilution" without loss of information content, which determines low computational requests for the processing unit 110. Just as an example, the frequency of the electric echo signal EES may be about 400 KHz and the frequency of the envelope signal $EES_{ENV}$ may be about 25 KHz.

According to an embodiment, the processing unit 110 comprises a module 125 for determining a portion of the envelope signal $EES_{ENV}$. In the description herein, the module 125 is also referred to as portion module 125 and the portion of the envelope signal $EES_{ENV}$ is also referred to as envelope signal portion $EES_{ENVp}$.

According to an embodiment, the envelope signal portion $EES_{ENVp}$ comprises a portion of the envelope signal $EES_{ENV}$ comprising a maximum value of the envelope signal $EES_{ENV}$, i.e., a portion of the envelope signal $EES_{ENV}$ at the left of the maximum value (hereinafter, left portion of the envelope signal $EES_{ENV}$) and a portion of the envelope signal $EES_{ENV}$ at the right of the maximum value (hereinafter, right portion of the envelope signal $EES_{ENV}$). The left portion of the envelope signal $EES_{ENV}$ and the right portion of the envelope signal $EES_{ENV}$ may have same time lengths, e.g., said portion of the envelope signal $EES_{ENV}$ is centered around said maximum value of the envelope signal $EES_{ENV}$, or may have different time lengths, e.g., said portion of the envelope signal $EES_{ENV}$ is not centered around said maximum value of the envelope signal $EES_{ENV}$.

As the envelope signal portion $EES_{ENVp}$ is a portion of the envelope signal $EES_{ENV}$, the envelope signal portion $EES_{ENVp}$ can be quickly processed by the following modules of the processing unit 110 (so as to obtain a fast TOF estimate, and hence a fast distance estimate $D_{EST}$). Thus, the portion module 125 performs a second signal "dilution" without loss of information content, which determines low computational requests for the processing unit 110.

Thanks to the low computational requests for the processing unit 110, the processing unit 110 may be a conventional microcontroller available on the market.

According to an embodiment, the envelope signal portion $EES_{ENVp}$ is determined based on one or more operative parameters.

Examples of operative parameters comprise, but are not limited to:

- a first operative parameter Perc_l indicative of a maximum length of the left portion of the envelope signal $EES_{ENV}$. In other words, the first operative parameter Perc_l is indicative of an admitted extent of the left portion of the envelope signal $EES_{ENV}$ over the abscissae axis (i.e., over time), and may for example depend on processing capabilities of the following modules of the processing unit 110 and/or on other design options;
- a second operative parameter Perc_u indicative of a maximum length of the right portion of the envelope signal $EES_{ENV}$. In other words, the second operative parameter Perc_u is indicative of an admitted extent of the right portion of the envelope signal $EES_{ENV}$ over the abscissae axis (i.e., over time), and may for example depend on processing capabilities of the following modules of the processing unit 110 and/or on other design options (therefore, the first and second operative parameters are indicative of a maximum length of the envelope signal portion $EES_{ENVp}$ over time);
- a third operative parameter Coeff1 indicative of an optimized length of the left portion of the envelope signal $EES_{ENV}$. In other words, the third operative parameter Coeff1 is indicative of an optimized extent (lower than the admitted extent) of the left portion of the envelope signal $EES_{ENV}$ over the abscissae axis (i.e., over time).

Compared to the admitted extent, the optimized length of the left portion of the envelope signal $EES_{ENV}$ can further reduce the computation requested by the following modules of the processing unit 110 without losing information content;

a fourth operative parameter Coeff1 indicative of an optimized length of the right portion of the envelope signal $EES_{ENV}$. In other words, the fourth operative parameter Coeff1 is indicative of an optimized extent (lower than the admitted extent) of the right portion of the envelope signal $EES_{ENV}$ over the abscissae axis. Therefore, the third and fourth operative parameters Coeff1, Coeff1 are indicative of an optimized length of the envelope signal portion $EES_{ENV,p}$ over time. Compared to the admitted extent, the optimized length of the right portion of the envelope signal $EES_{ENV}$ can further reduce the computation requested by the following modules of the processing unit 110 without losing information content.

In the following, when distinguishing among the first, second, third and fourth operative parameters is not relevant for understanding the disclosure the operative parameters will be globally denoted by $OP_k$, wherein k denotes the iteration of the TOF method—indeed, as better discussed in the following, according to an embodiment the operative parameters, or at least a subset thereof, are tuned or adjusted or updated at each iteration of the TOF method.

According to an embodiment, the operative parameters, or a subset thereof, are determined according to Particle Swarm Optimization, as discussed herein in details.

According to an embodiment, the portion module 125, better discussed in the following, is configured to determine the envelope signal portion $EES_{ENVp}$ by applying to the envelope signal $EES_{ENV}$ the first and second operative parameters Perc_l, Perc_u at a first phase, and the third and fourth operative parameters Coeff1, Coeff2 at a second phase (following the first phase) aimed at optimizing the length of the envelope signal portion $EES_{ENVp}$.

According to an embodiment, the processing unit 110 comprises a module 130 for processing the envelope signal portion $EES_{ENVp}$ and the noise power NP of the electric echo signal EES according to an Unscented Kalman Filter (reason why, in the following, the module 130 will be referred to as UKF ("Unscented Kalman Filter") module 130).

Kalman filter is an algorithm that uses a series of measurements observed over time, containing statistical noise and other inaccuracies, and produces estimates of unknown variables that tend to be more accurate than those based on a single measurement alone, by estimating a joint probability distribution over the variables for each timeframe.

The Kalman filter keeps track of the estimated state of the system and the variance or uncertainty of the estimate. The estimate is updated using a state transition model and measurements.

The algorithm works in a two-step process. In a prediction step, the Kalman filter produces estimates of the current state variables, along with their uncertainties. Once the outcome of the next measurement, possibly corrupted with some amount of error, including random noise, is observed, these estimates are updated using a weighted average, with more weight being given to estimates with higher certainty. The algorithm is recursive. It can run in real time, using only the present input measurements and the previously calculated state and its uncertainty matrix; no additional past information is required.

Unscented Kalman filter is a generalization of the Kalman filter which works on nonlinear systems. In the UKF, the probability density is approximated by a deterministic sampling of points which represent the underlying distribution as a Gaussian. The nonlinear transformation (referred to as unscented transformation) of these points are intended to be an estimate of the posterior distribution, the moments of which can then be derived from the transformed samples.

According to an embodiment, the UKF module 130 is configured to process the envelope signal portion $EES_{ENVp}$ and the noise power NP of the electric echo signal based on one or more UKF parameters (the UKF parameters, or a subset thereof, being determined according to the Particle Swarm Optimization, as better discussed in the following).

Examples of UKF parameters comprise, but are not limited to an evaluation parameter ("to_md_capture") providing a first, rough evaluation of the TOF estimate (so as to provide a good starting point to the UKF module 130), a control parameter ("Kappa_p") for controlling the spread of the sigma points around the mean state value, and a correction parameter ("powerNoiseCorr") providing a correction on the noise power NP. In some embodiments, the correction parameter being for example an additive correction factor to be added to the noise covariance matrix associated with the electric echo signal EES. In other words, the "to_md_capture" parameter is indicative of an approximate estimation of the time-of-flight used as a starting point for the time-of-flight calculation and is proportional to x_max_inv−3σ, the x_max_inv being described in the following and the a being a predefined value linked to the standard deviation of a Gaussian curve approximating the envelope signal portion $EES_{ENV,p}$, and the "Kappa_p" parameter is indicative of the spread of the sigma points around a mean value of the state variable of the UKF.

as described herein, the UKF parameters will be globally denoted by $UKFP_k$, wherein k denotes the iteration of the TOF method. As further discussed herein, according to an embodiment the UKF parameters are tuned or adjusted or updated at each iteration of the TOF method.

According to an embodiment, the UKF module 130 is configured to process the envelope signal portion $EES_{ENVp}$ and the noise power NP of the electric echo signal EES to obtain an estimate of the envelope signal $EES_{ENV}$ (hereinafter referred to as envelope signal estimate $EES_{ENVest}$). According to an embodiment, the envelope signal estimate $EES_{ENVest}$ is a regenerated version of the envelope signal $EES_{ENV}$ being regenerated from the envelope signal portion $EES_{ENVp}$ (see, for example, L. Angrisani, A. Baccigalupi, R. Schiano Lo Moriello, "Ultrasonic time-of-flight estimation through unscented Kalman filter", IEEE Transactions on Instrumentation and Measurement, August 2006).

According to an embodiment, the processing unit 110 comprises a module (hereinafter, evaluation module) 135 for determining the TOF estimate according to the envelope signal estimate $EES_{ENVest}$.

According to an embodiment, the TOF estimate is based on the following discrete-time expression modelling the ultrasonic signal envelope (see, for example, L. Angrisani, A. Baccigalupi, R. Schiano Lo Moriello, "Ultrasonic time-of-flight estimation through unscented Kalman filter", IEEE Transactions on Instrumentation and Measurement, August 2006):

$$A(kt_s) = A_0 \left(\frac{kt_s - \tau}{T}\right)^\alpha e^{\left(\frac{kt_s - \tau}{T}\right)}$$

wherein:

$A_0$ is the amplitude of the electric echo signal EES;

α and T are parameters depending on the adopted ultrasonic transducer;

τ is the TOF estimate, and $t_s$ is the sampling period.

According to an embodiment, the evaluation module 135 is configured to determine, according to the TOF estimate, the distance estimate $D_{EST}$ between the target object T and the TOF device 100.

According to an embodiment, the processing unit 110 comprises a module (hereinafter, error module) 140 for determining an estimate error e. As better discussed in the following, the operative parameters $OP_k$ (or a subset thereof) and the UKF parameters $UKFP_k$ (or a subset thereof) are determined according to the Particle Swarm Optimization receiving the estimate error ε as input).

According to an embodiment, the estimate error e determined at the error module 140 comprises a difference between the distance estimate $D_{EST}$ and the distance $D_{ACT}$ (i.e., the actual distance) between the TOF device 100 and the target body T. As will be better understood from the following discussion, this embodiment allows iteratively adjusting, tuning, updating or refining the operative parameters $OP_k$ (or a subset thereof) and the UKF parameters $UKFP_k$ at a preliminary or calibrating phase of the TOF device 100 (i.e., a phase that precedes the use of the TOF device 100 as a meter, e.g., as a distance meter). As better discussed in the following, this preliminary or calibrating phase of the TOF device 100 is obtained through an embodiment of the TOF method (hereinafter referred to as "offline TOF method"), in which a known target body T placed at a known distance $D_{ACT}$ is used to set the operative parameters $OP_k$ and the UKF parameters $UKFP_k$ to be subsequently used by the TOF device 100 when used as a meter (e.g., a distance meter).

According to an embodiment, the estimate error e determined at the error module 140 comprises a difference between the envelope signal estimate $EES_{ENVest}$ and the envelope signal $EES_{ENV}$. As will be better understood from the following discussion, this embodiment allows iteratively adjusting, tuning, updating or refining a subset of the operative parameters $OP_k$ and a subset of the UKF parameters $UKFP_k$ in real-time during the use of the TOF device 100 as a meter (e.g., as a distance meter). As better discussed in the following, this is obtained through an embodiment of the TOF method (hereinafter referred to as "online TOF method").

According to an embodiment, the TOF device 100 may be configured to implement the offline TOF method (in which case the distance estimate $D_{EST}$ and the distance $D_{ACT}$ are received at the error module 140), or the online TOF method (in which case the envelope signal $EES_{ENV}$ and the envelope signal estimate $EES_{ENVest}$ are received at the error module 140), or both the offline and online TOF methods (for example, with the online TOF method that may follow the offline TOF method): the possibility of implementing the offline TOF method and/or the online TOF method is conceptually represented in FIG. 1 by dashed arrows associated the distance estimate $D_{EST}$, the distance $D_{ACT}$, the envelope signal $EES_{ENV}$ and the envelope signal estimate $EES_{ENVest}$ being input to the error module 140.

According to an embodiment, the processing unit 110 comprises a module (hereinafter, Swarm module) 145 for determining the operative parameters $OP_k$ (or the subset of operative parameters $OP_k$) and the UKF parameters $UKFP_k$ (or the subset of UKF parameters $UKFP_k$) according to the Particle Swarm Optimization and based on the estimate error E received as input by the error module 140.

Particle Swarm Optimization is a computational method that optimizes a problem by iteratively trying to improve a candidate solution with regard to a given measure of quality. It solves a problem by having a population of candidate solutions, called particles, and moving these particles around in the search-space according to simple mathematical formulae over the particle's position and velocity. Each particle's movement is influenced by its local best known position, but is also guided toward the best known positions in the search-space, which are updated as better positions are found by other particles.

The main equations of the Particle Swarm Optimization are the following:

$$C_{i,j} = c_1 r_{1,j}(p_{i,j}(t-1) - x_{i,j}(t-1))$$

$$S_j = c_2 r_{2,j}(g_{i,j}(t-1) - x_{i,j}(t-1))$$

$$V_{i,j}(t) = w V_{i,j}(t-1) + C_{i,j} + S_{i,j}$$

$$x_{i,j}(t) = x_{i,j}(t-1) + V_{i,j}(t)$$

wherein:

$p_{i,j}$ is the local best of the i-th particle;

$g_{i,j}$ is the global best of i-th particle in the current neighborhood;

$C_{i,j}$ is the i-th cognitive parameter in j-dimensional search space;

$S_{i,j}$ is the i-th social parameter in j-dimensional search space;

$V_{i,j}(t)$ is the i-th particle velocity parameter in j-dimensional search space;

$x_{i,j}$ (t) is the i-th particle position (solution) in j-dimensional search space;

$r_{1,j}, r_{2,j}$ are uniformly distributed random values in [0,1];

$c_1, c_2$ are acceleration coefficients for both cognitive and social components; and w is the inertia weight aimed at judging between exploring and exploiting phases.

Figure 2A:
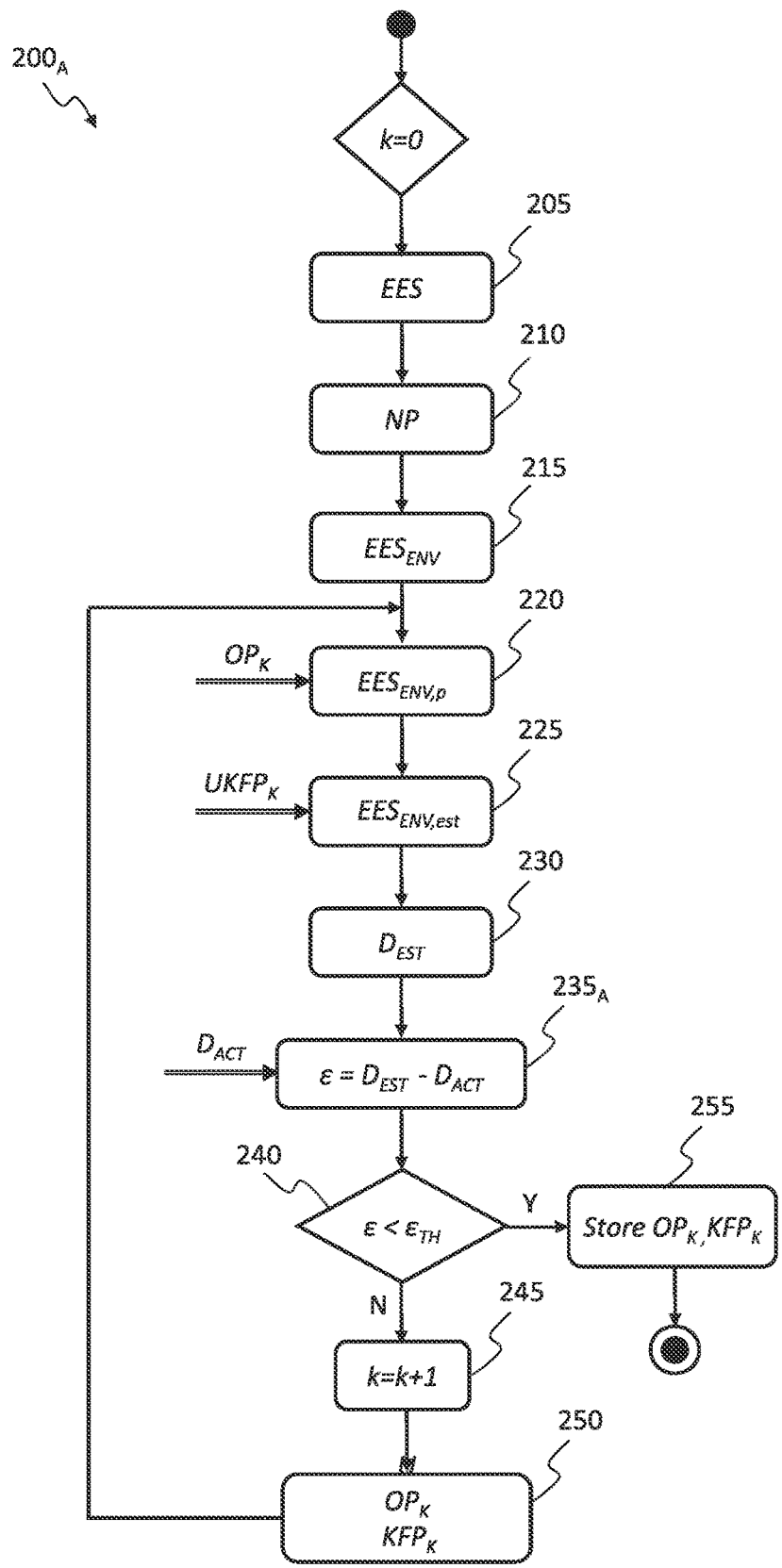
FIGS. 2A and 2B show activity diagrams of methods according to respective embodiments of the present disclosure.

FIG. 2A shows an activity diagram of an offline TOF method $200_A$ according to embodiments of the present disclosure.

According to an embodiment, the offline TOF method $200_A$ is implemented by proper software instructions stored in or accessible by the TOF device 100, and/or by proper hardware/firmware of the TOF device 100.

According to an embodiment, the offline TOF method $200_A$ comprises acquiring the ultrasonic echo signal UES thereby obtaining the corresponding electric echo signal EES (action node 205). According to an embodiment, the acquisition of the ultrasonic echo signal UES to obtain the corresponding electric echo signal EES is performed at the conditioning and conversion system (not shown) of the ultrasonic transducer 105.

According to an embodiment, the offline TOF method $200_A$ comprises determining the noise power NP of the electric echo signal EES (action node 210). According to an embodiment, the noise power NP of the electric echo signal EES is determined at the Fourier module 115 of the processing unit 110.

According to an embodiment, the offline TOF method $200_A$ comprises determining the envelope signal $EES_{ENV}$ (action node 215). According to an embodiment, the envelope signal $EES_{ENV}$ is determined at the Hilbert module 120 of the processing unit 110.

According to an embodiment, the offline TOF method $200_A$ comprises determining the envelope signal portion $EES_{ENVp}$ (action node 220). According to an embodiment, the envelope signal portion $EES_{ENVp}$ is determined at the portion module 125 of the processing unit 110. According to an embodiment, the envelope signal portion $EES_{ENVp}$ is determined based on the operative parameters $OP_k$ resulting from Particle Swarm Optimization performed at the previous ((k−1)-th) iteration before the current (k-th) iteration. According to an embodiment, at a first running of the offline TOF method $200_A$ (k=0), in which no operative parameter tuning based on Particle Swarm Optimization has yet taken place, the operative parameters $OP_k$ are at default values, the default values being for example determined at manufacturer side, e.g., based on design experience.

According to an embodiment, the offline TOF method $200_A$ comprises determining the envelope signal estimate $EES_{ENVest}$ according to the envelope signal portion $EES_{ENVp}$ and the noise power NP (action node 225). According to an embodiment, the envelope signal portion $EES_{ENVp}$ is determined at the UKF module 130 of the processing unit 110, as better discussed in the following with reference to FIG. 4. According to an embodiment, the envelope signal estimate $EES_{ENVest}$ is determined based on the UKF parameters $UKFP_k$ resulting from Particle Swarm Optimization performed at the previous ((k−1)-th) iteration before the current (k-th) iteration. According to an embodiment, at a first running of the offline TOF method $200_A$ (k=0), in which no UKF parameters tuning based on Particle Swarm Optimization has yet taken place, the UKF parameters $UKFP_k$ are at default values, the default values for example being determined at manufacturer side, e.g., based on designer experience.

According to an embodiment, the offline TOF method $200_A$ comprises determining the TOF estimate according to the envelope signal estimate $EES_{ENVest}$ and the distance estimate $D_{EST}$ according to the TOF estimate (action node 230). According to an embodiment, the TOF estimate and the distance estimate $D_{EST}$ are determined at the evaluation module 135 of the processing unit 110.

According to an embodiment, the offline TOF method $200_A$ comprises determining the estimate error e as the difference between the distance estimate $D_{EST}$ and the distance $D_{ACT}$ (action node 235A). According to an embodiment, the estimate error e is determined at the error module 140 of the processing unit 110.

According to an embodiment, the offline TOF method $200_A$ comprises iteratively adjusting and refining the operative parameters $OP_k$ and the UKF parameters $UKFP_k$ (or a subset thereof) as long as the estimate error E is higher than a threshold estimate error ETH. According to an embodiment, if the estimate error E is higher than the threshold estimate error ETH (exit branch N of decision node 240), the following iteration starts (k=k+1, action node 245), and the operative parameters $OP_k$ and the UKF parameters $UKFP_k$ are adjusted at the Swarm module 145 of the processing unit 110 based on the estimate error E received as input by the error module 140 and on the Particle Swarm Optimization.

According to an embodiment, nodes 220-250 are repeated as such as long as the estimate error ε is higher than the threshold estimate error ETH.

Back to decision node 240, according to an embodiment, if the estimate error ε is lower than the threshold estimate error ETH (exit branch Y of decision node 240), which means that the operative parameters $OP_k$ and the UKF parameters $UKFP_k$ have been optimized, the optimized operative parameters $OP_k$ and the optimized UKF parameters $UKFP_k$ are properly stored (action node 255) to be used for the following running of the offline TOF method $200_A$ (or for the subsequent running of the online TOF method), then the offline TOF method $200_A$ ends.

The offline TOF method may be useful in the design phase, in which the TOF estimate is determined with great accuracy from a set of signals in a supervised manner and with known measurement conditions. The Applicant has experimentally ascertained that a TOF device with operative and UKF parameters optimized through the offline TOF method is capable of managing a very large number of shapes of ultrasonic echo signals for distances within 0.30 m to 2 m, with a mean accuracy lower than 3 mm.

Figure 2B:
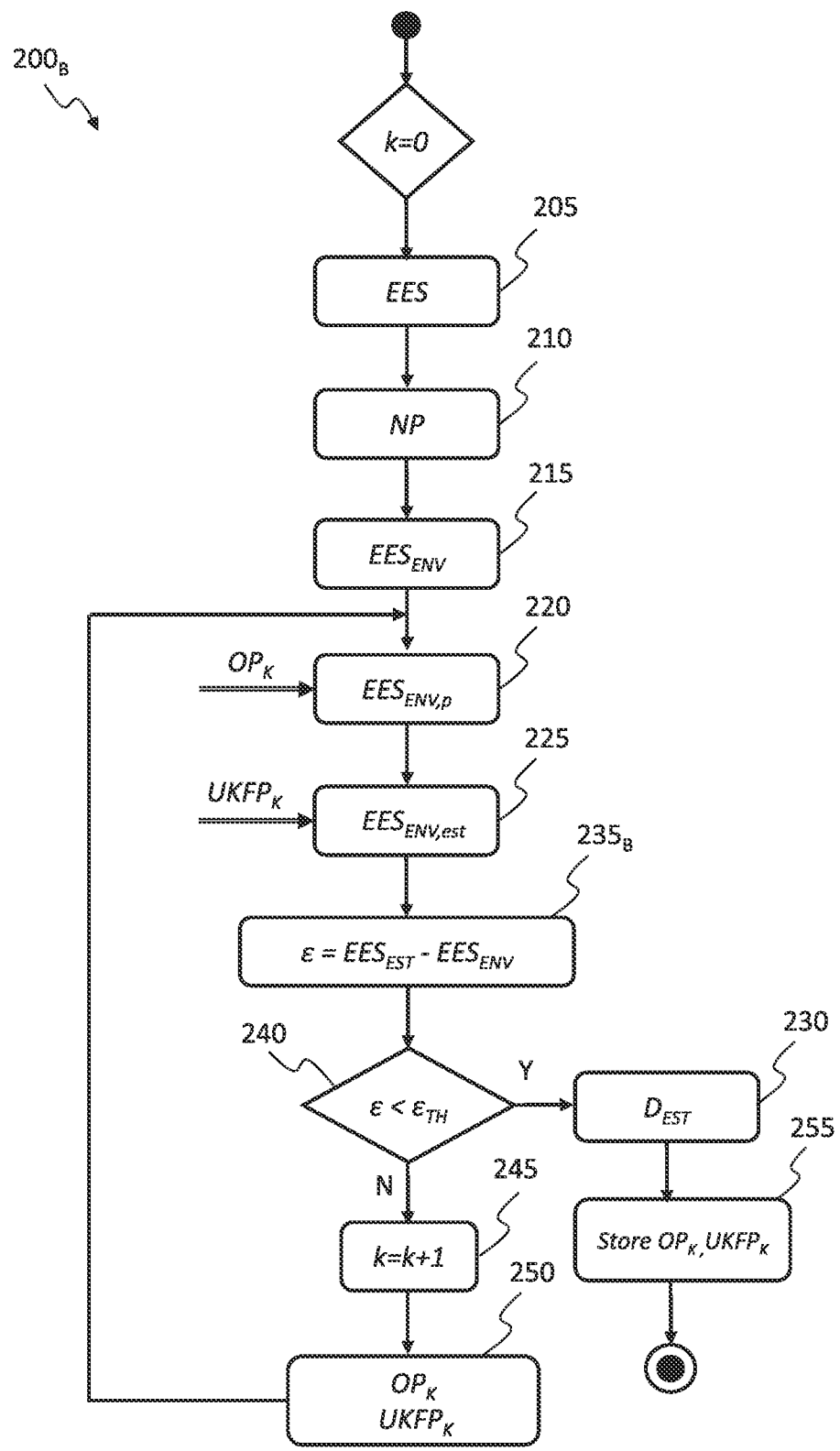

FIG. 2B shows an activity diagram of an online TOF method $200_B$ according to embodiments of the present disclosure.

According to an embodiment, the online TOF method $200_B$ is implemented by proper software instructions stored in or accessible by the TOF device 100, and/or by proper hardware/firmware of the TOF device 100.

According to an embodiment, the online TOF method $200_B$ comprises acquiring the ultrasonic echo signal UES thereby obtaining the corresponding electric echo signal EES (action node 205). According to an embodiment, the acquisition of the ultrasonic echo signal UES to obtain the corresponding electric echo signal EES is performed at the conditioning and conversion system (not shown) of the ultrasonic transducer 105.

According to an embodiment, the online TOF method $200_B$ comprises determining the noise power NP of the electric echo signal EES (action node 210). According to an embodiment, the noise power NP of the electric echo signal EES is determined at the Fourier module 115 of the processing unit 110.

According to an embodiment, the online TOF method $200_B$ comprises determining the envelope signal $EES_{ENV}$ (action node 215). According to an embodiment, the envelope signal $EES_{ENV}$ is determined at the Hilbert module 120 of the processing unit 110.

According to an embodiment, the online TOF method $200_B$ comprises determining the envelope signal portion $EES_{ENVp}$ (action node 220). According to an embodiment, the envelope signal portion $EES_{ENVp}$ is determined at the portion module 125 of the processing unit 110. According to an embodiment, the envelope signal portion $EES_{ENVp}$ is determined based on the subset of the operative parameters $OP_k$ resulting from Particle Swarm Optimization performed at the previous ((k−1)-th) iteration before the current (k-th) iteration. According to an embodiment, at a first running of the online TOF method $200_B$ (k=0), in which no operative parameter tuning based on Particle Swarm Optimization has yet taken place, the subset of the operative parameters $OP_k$ are at default values, the default values being for example determined at manufacturer side, e.g., based on designer experience, or at an offline TOF method (such as the offline TOF method $200_A$) performed before the online TOF method $200_B$.

According to an embodiment, the subset of the operative parameters $OP_k$ comprise, but are not limited to, the third and fourth operative parameters Coeff1, Coeff2 (i.e., the operative parameters indicative of optimized lengths of the left and right portions of the envelope signal $EES_{ENV}$, and hence of an optimized overall length of the envelope signal portion $EES_{ENVp}$ over the abscissae axis). Indeed, the Applicant has experimentally ascertained that the first and second operative parameters Perc_l, Perc_u, especially when they are tuned during an offline TOF method (such as the offline TOF method $200_A$) preceding the online TOF method $200_B$, are valid enough to allow identifying (together with the third and fourth operative parameters Coeff1, Coeff2 tuned during the online method $200_B$) the best envelope signal portion $EES_{ENVp}$.

According to an embodiment, the online TOF method $200_B$ comprises determining the envelope signal estimate $EES_{ENVest}$ according to the envelope signal portion $EES_{ENVp}$ and the noise power NP (action node 225). According to an embodiment, the envelope signal portion $EES_{ENVp}$ is determined at the UKF module 130 of the processing unit 110, as better discussed in the following with reference to FIG. 4. According to an embodiment, the envelope signal estimate $EES_{ENVest}$ is determined based on the subset of the UKF parameters $UKFP_k$ resulting from Particle Swarm Optimization performed at the previous ((k−1)-th) iteration before the current (k-th) iteration. According to an embodiment, at a first running of the online TOF method $200_B$ (k=0), in which no UKF parameters tuning based on Particle Swarm Optimization has yet taken place, the subset of the UKF parameters $UKFP_k$ are at default values, the default values being for example determined at manufacturer side, e.g., based on designer experience.

According to an embodiment, the subset of the UKF parameters $UKFP_k$ comprise, but are not limited to, the evaluation parameter and the control parameter. Indeed, the Applicant has experimentally ascertained that some parameters, such as the correction parameter, do not affect (or do not substantially affect) the TOF estimate. Therefore, according to an embodiment, the correction parameter, especially when it is tuned during an offline TOF method (such as the offline TOF method $200_A$) preceding the online TOF method $200_B$, is not tuned again during the online TOF method $200_B$.

According to an embodiment, the online TOF method $200_B$ comprises determining the estimate error e as the difference between the envelope signal estimate $EES_{ENVest}$ and the envelope signal $EES_{ENV}$ (action node 235B). According to an embodiment, the estimate error e is determined at the error module 140 of the processing unit 110.

According to an embodiment, the online TOF method $200_B$ comprises iteratively adjusting and refining the subset of the operative parameters $OP_k$ and the subset of the UKF parameters $UKFP_k$ as long as the estimate error ε is higher than a threshold estimate error $\varepsilon_{TH}$. According to an embodiment, if the estimate error ε is higher than the threshold estimate error $\varepsilon_{TH}$ (exit branch N of decision node 240), the following iteration starts (k=k+1, action node 245), and the subset of the operative parameters $OP_k$ and the subset of the UKF parameters $UKFP_k$ are adjusted at the Swarm module 145 of the processing unit 110 based on the estimate error ε received as input by the error module 140 and on the Particle Swarm Optimization.

According to an embodiment, nodes 220-250 are repeated as such as long as the estimate error ε is higher than the threshold estimate error $\varepsilon_{TH}$.

Back to decision node 240, according to an embodiment, if the estimate error ε is lower than the threshold estimate error $\varepsilon_{TH}$ (exit branch Y of decision node 240), which means that the subset of the operative parameters $OP_k$ and the subset of the UKF parameters $UKFP_k$ have been optimized, the TOF estimate is determined according to the envelope signal estimate $EES_{ENVest}$ (i.e., the envelope signal estimate $EES_{ENVest}$ determined based on the optimized subset of the operative parameters $OP_k$ and the optimized subset of the UKF parameters $UKFP_k$) and the distance estimate $D_{EST}$ is determined according to the TOF estimate (action node 230). According to an embodiment, the TOF estimate and the distance estimate $D_{EST}$ are determined at the evaluation module 135 of the processing unit 110.

According to an embodiment, the optimized subset of the operative parameters $OP_k$ and the optimized subset of the UKF parameters $UKFP_k$ are properly stored (action node 255) to be used for the following running of the online TOF method $200_B$.

The online TOF method provides a TOF estimate that dynamically and automatically adapts to different external conditions.

As an example, the offline TOF method $200_A$ and the online TOF method $200_B$ are carried out on a training dataset comprising, for example, 160 ultrasonic echo signals (e.g., 135 used for the offline tuning and 25 used for testing the online tuning) indicative of distances between the target object T and the TOF device 100 ranging between about 0.3 m and about 2 m and acquired at a sampling rate of about 400 kS/s. In particular, the 25 ultrasonic echo signals used for testing the online tuning are acquired under various operative conditions (e.g., variable temperature, humidity, wind speed, etc.).

Figure 3:
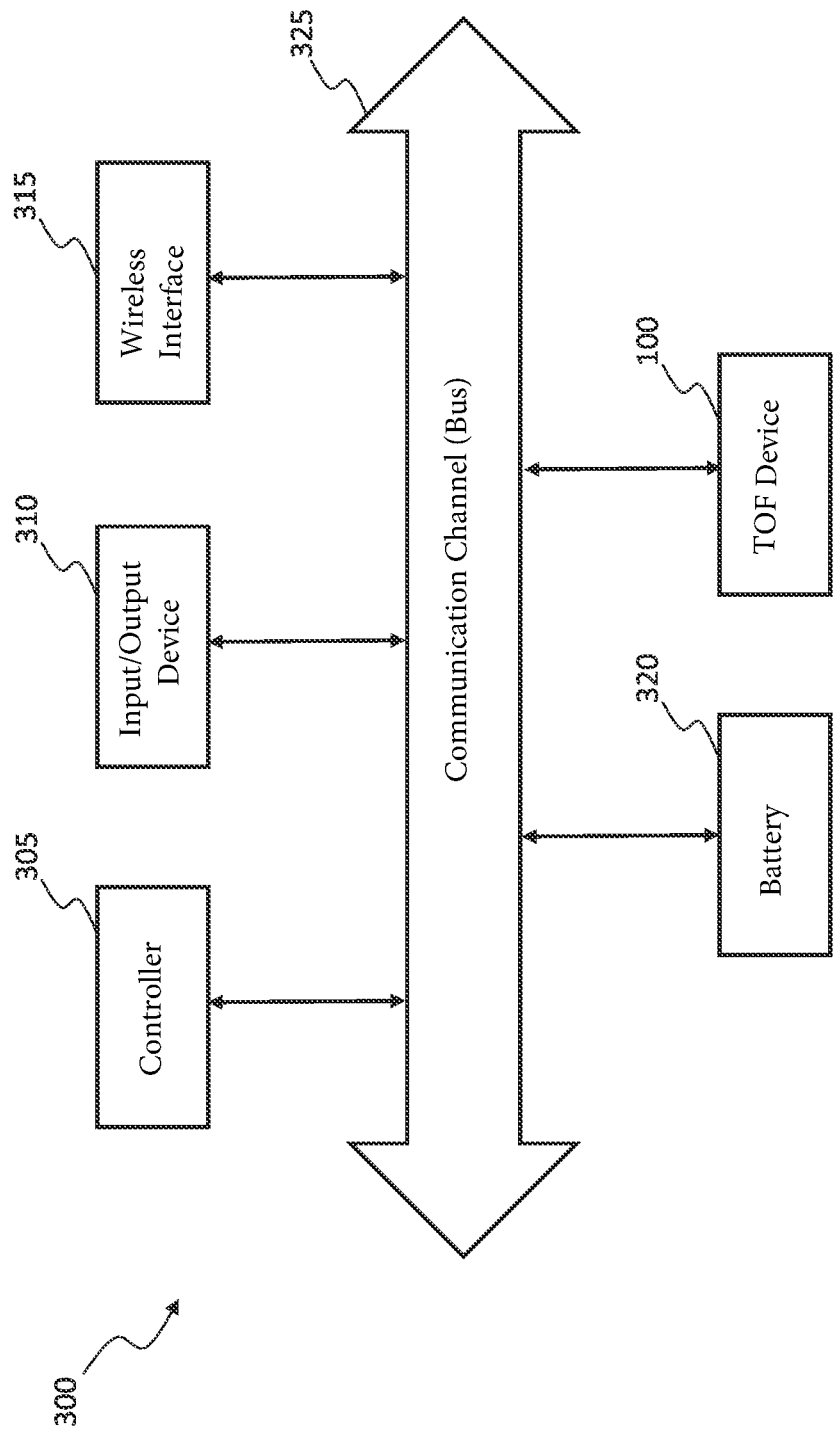
FIG. 3 shows a simplified block diagram of an electronic system comprising the device of FIG. 1 according to an embodiment of the present disclosure.

Referring now to FIG. 3, it shows a simplified block diagram of an electronic system 300 (i.e., a portion thereof) comprising the TOF device 100 (or more thereof) according to an embodiment of the present disclosure.

According to an embodiment, the electronic system 300 is suitable for use in electronic apparatus.

According to an embodiment, the electronic system 300 comprises a controller 305 (for example, one or more microprocessors and/or one or more microcontrollers).

According to an embodiment, the electronic system 300 comprises an input/output device 310 (for example, a keyboard and/or a screen). The input/output device 310 may for example be used to generate and/or receive messages. The input/output device 310 may for example be configured to receive/supply a digital signal and/or an analog signal.

According to an embodiment, the electronic system 300 comprises a wireless interface 315 for exchanging messages with a wireless communication network (not shown), for example by means of radio frequency signals. Examples of a wireless interface may include antennas and wireless transceivers.

According to an embodiment, the electronic system 300 comprises a power supply device (for example, a battery 320) for powering the electronic system 300.

According to an embodiment, the controller 305 (or one or more dedicated computing units, not shown) may be configured to determine additional information (such as displacement information, level information, material information, structure information, vibration information, and medical diagnostic information) based on the distance information provided by the TOF device 100.

According to an embodiment, the electronic system 300 comprises one more communication channels (bus) 325 to allow the exchange of data between the TOF device 100, the controller 305 (when provided), the input/output device 310 (when provided), the wireless interface 315 (when provided), and the power supply device 320 (when provided).

Figure 4:
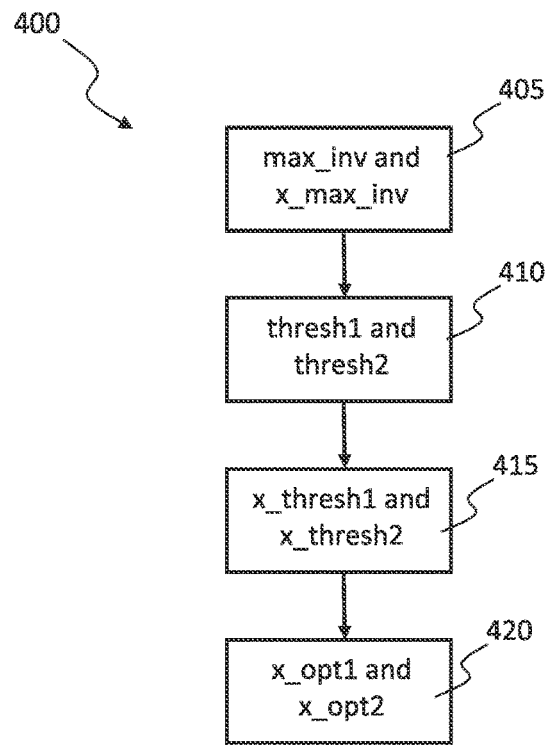
FIGS. 4 and 5 show activity diagrams of respective methods according to respective embodiments of the present disclosure.

FIG. 4 shows an activity diagram of a signal cutting method 400 according to embodiments of the present invention. The signal cutting method 400 allows, during use of the TOF device 100, to determine the envelope signal portion $EES_{ENVp}$ by applying the operative parameters to the envelope signal $EES_{ENV}$.

According to an embodiment, the signal cutting method 400 is implemented by proper software instructions stored in or accessible by the TOF device 100, and/or by proper hardware/firmware of the TOF device 100. In particular, the signal cutting method 400 is implemented by the portion module 125.

In details, the signal cutting method 400 comprises determining the maximum of the envelope signal $EES_{ENV}$ (action node 405) according to per se known techniques, i.e. comprises calculating a maximum value max_inv of the envelope signal $EES_{ENV}$ and a first temporal position x_max_inv (over the abscissae axis, i.e. over time; also called first time instant x_max_inv) in the envelope signal $EES_{ENV}$ of said maximum value max_inv.

The signal cutting method 400 comprises calculating, through the first and the second operative parameter Perc_l, Perc_u, respectively a first threshold value thresh1 and a second threshold value thresh2 of the envelope signal $EES_{ENV}$ (action node 410), which are lower than the maximum value max_inv. In details, the first threshold value thresh1 is a threshold for the envelope signal $EES_{ENV}$ that is related to a maximum length of the left portion of the envelope signal $EES_{ENV}$, and the second threshold value thresh2 is a threshold for the envelope signal $EES_{ENV}$ that is related to a maximum length of the right portion of the envelope signal $EES_{ENV}$. In other words, the left portion of the envelope signal $EES_{ENV}$ comprises values of the envelope signal $EES_{ENV}$ ranging between the first threshold value thresh1 and the maximum value max_inv, and the right portion of the envelope signal $EES_{ENV}$ comprises values of the envelope signal $EES_{ENV}$ ranging between the maximum value max_inv and the second threshold value thresh2. In further details, the first threshold value thresh1 and the second threshold value thresh2 are calculated based on (in particular, dependent on the product of) the maximum value max_inv of the envelope signal $EES_{ENV}$ and the first and, respectively, the second operative parameter Perc_l, Perc_u. In particular, thresh1=Perc_l·max_inv and thresh2=Perc_u·max_inv.

The signal cutting method 400 further comprises determining a second temporal position x_thresh1 (over the abscissae axis, i.e. over time; also called second time instant x_max_inv) of the first threshold value thresh1 and a third temporal position x_thresh2 (over the abscissae axis, i.e. over time; also called third time instant x_max_inv) of the second threshold value thresh2 in the envelope signal $EES_{ENV}$ (action node 415), the second and third temporal position x_thresh1, x_thresh2 being related to a maximum length of the left and, respectively, right portion of the envelope signal $EES_{ENV}$. The first and second temporal positions x_thresh1, x_thresh2 are the temporal positions of the envelope signal $EES_{ENV}$ at which the envelope signal $EES_{ENV}$ assumes the first and, respectively, the second threshold values thresh1, thresh2 and are positioned prior to and, respectively, following the first temporal position x_max_inv (i.e., are at left and, respectively, at right of the first temporal position x_max_inv on the time scale). In other words, x_thresh1=x_max_inv−Δ1 and x_thresh2=x_max_inv−Δ2, where Δ1 and Δ2 are respective time intervals whose lengths correspond to the maximum time lengths of the left and, respectively, right portions of the envelope signal $EES_{ENV}$. Therefore, the left portion of the envelope signal $EES_{ENV}$ ranges at most between the second temporal position x_thresh1 and the first temporal position x_max_inv, and the right portion of the envelope signal $EES_{ENV}$ ranges at most between the first temporal position x_max_inv and the third temporal position x_thresh2.

Therefore, according to an embodiment, the envelope signal portion $EES_{ENVp}$ includes (in details, coincides with) the portion of the envelope signal $EES_{ENV}$ comprised between the second temporal position x_thresh1 and the third temporal position x_thresh2.

Optionally, according to a different embodiment, the signal cutting method 400 further comprises optimizing the envelope signal portion $EES_{ENVp}$ by calculating, through the third and fourth operative parameters Coeff1, Coeff2, a fourth temporal position x_opt1 (over the abscissae axis, i.e. over time; also called fourth time instant x_max_inv) and a fifth temporal position x_opt2 (over the abscissae axis, i.e. over time; also called fifth time instant x_max_inv) of the envelope signal $EES_{ENV}$ (action node 420). The fourth temporal position x_opt1 is greater than the second temporal position x_thresh1 and depends on the second temporal position x_thresh1 and the third operative parameter Coeff1, and the fifth temporal position x_opt2 is lower than the third temporal position x_thresh2 and depends on the third temporal position x_thresh2 and the fourth operative parameter Coeff2. In the present embodiment, the envelope signal portion $EES_{ENVp}$ includes (in details, coincides with) the portion of the envelope signal $EES_{ENV}$ comprised between the fourth temporal position x_opt1 and the fifth temporal position x_opt2. In other words, the fourth temporal position x_opt1 and the fifth temporal position x_opt2 are indicative of an optimized length of the left and, respectively, of the right portion of the envelope signal $EES_{ENV}$. In particular, x_thresh1<x_opt1<x_max_inv and x_max_inv<x_opt2<x_thresh2. In further details, the third and fourth operative parameters Coeff1, Coeff2 are indicative of respective time offsets to be applied respectively to the second and third temporal positions x_thresh1, x_thresh2 to obtain the fourth and fifth temporal position x_opt1, x_opt2. In other words, x_opt1=x_thresh1+Coeff1 and x_opt2=x_thresh2−Coeff2, where Coeff1<Δ1 and Coeff2<Δ2. Therefore, in the present case the optimized left portion of the envelope signal $EES_{ENV}$ ranges between the fourth temporal position x_opt1 and the first temporal position x_max_inv, and the optimized right portion of the envelope signal $EES_{ENV}$ ranges between the first temporal position x_max_inv and the fifth temporal position x_opt2.

Figure 5:
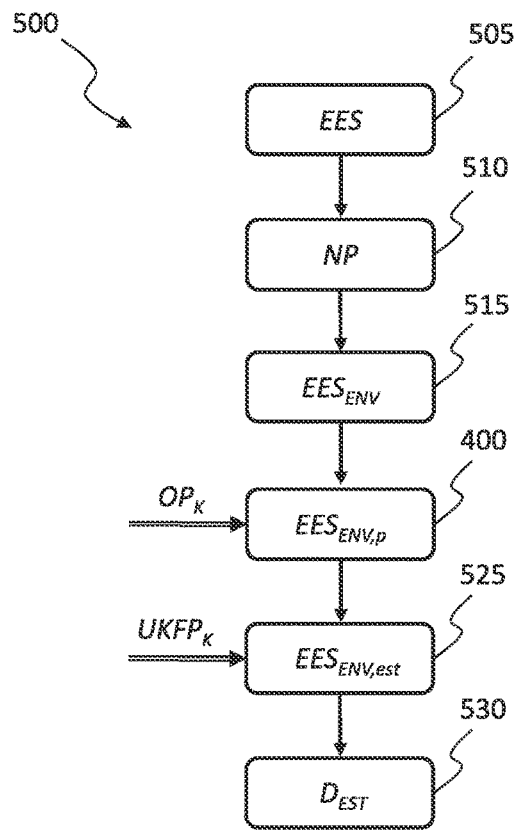

FIG. 5 shows an activity diagram of a time-of-flight estimation method 500 according to embodiments of the present invention. The time-of-flight estimation method 500 allows to estimate the time-of-flight between the ultrasonic signal emitted by the TOF device 100 and the ultrasonic echo signal returned by the target object T hit by the ultrasonic signal and received at the TOF device 100.

According to an embodiment, the time-of-flight estimation method 500 is implemented by proper software instructions stored in or accessible by the TOF device 100, and/or by proper hardware/firmware of the TOF device 100.

According to an embodiment, the time-of-flight estimation method 500 comprises acquiring the ultrasonic echo signal UES thereby obtaining the corresponding electric echo signal EES (action node 505). According to an embodiment, the acquisition of the ultrasonic echo signal UES to obtain the corresponding electric echo signal EES is performed at the conditioning and conversion system (not shown) of the ultrasonic transducer 105.

According to an embodiment, the time-of-flight estimation method 500 comprises determining the noise power NP of the electric echo signal EES (action node 510). According to an embodiment, the noise power NP of the electric echo signal EES is determined at the Fourier module 115 of the processing unit 110.

According to an embodiment, the time-of-flight estimation method 500 comprises determining the envelope signal $EES_{ENV}$ (action node 515). According to an embodiment, the envelope signal $EES_{ENV}$ is determined at the Hilbert module 120 of the processing unit 110.

According to an embodiment, the time-of-flight estimation method 500 comprises determining the envelope signal portion $EES_{ENV,p}$ (action node 400) according to the previously described signal cutting method 400. According to an embodiment, the envelope signal portion $EES_{ENV,p}$ is determined at the portion module 125 of the processing unit 110 based on the operative parameters $OP_k$ resulting from the offline TOF method $200_A$ or the online TOF method $200_B$.

According to an embodiment, the time-of-flight estimation method 500 comprises determining the envelope signal estimate $EES_{ENV,est}$ according to the envelope signal portion $EES_{ENV,p}$ and the noise power NP (action node 525). According to an embodiment, the envelope signal portion $EES_{ENV,p}$ is determined at the UKF module 130 of the processing unit 110 based on the UKF parameters $UKFP_k$ resulting from the offline TOF method $200_A$ or the online TOF method $200_B$.

According to an embodiment, the time-of-flight estimation method 500 comprises determining the TOF estimate according to the envelope signal estimate $EES_{ENV,est}$ and the distance estimate $D_{EST}$ according to the TOF estimate (action node 530). According to an embodiment, the TOF estimate and the distance estimate $D_{EST}$ are determined at the evaluation module 135 of the processing unit 110.

From an examination of the characteristics of the invention made according to the present invention, the advantages that it allows are evident.

The signal cutting method 400 reduces the computational cost required for estimating the time-of-flight through the time-of-flight estimation method 500, in particular by reducing the computation cost of the UKF module 130.

The envelope signal portion $EES_{ENV,p}$ outputted by the action node 415 is already optimized for the UKF module 130. Nevertheless, calculating the envelope signal portion $EES_{ENV,p}$ according to the action node 420 allows to further reduce the computational cost and improve the time-of-flight estimation accuracy.

The optimized subset of the operative parameters $OP_k$ and the optimized subset of the UKF parameters $UKFP_k$ are calculated through the offline TOF method $200_A$. Moreover, the third and fourth operative parameters Coeff1, Coeff2 can be further optimized through the online TOF method $200_B$.

Finally, it is clear that modifications and variations may be made to the invention described and illustrated herein without thereby departing from the scope of the present invention, as defined in the attached claims. For example, the different embodiments described may be combined to provide further solutions.

Method ($200_A$; $200_B$) for providing an estimate of a time-of-flight between an ultrasonic signal emitted by a device (100) and an ultrasonic echo signal returned by a target object (T) hit by the ultrasonic signal and received at the device, the method may be summarized as including acquiring (205) the ultrasonic echo signal thereby obtaining an electric echo signal; determining (210) a noise power of the electric echo signal; determining (215) an envelope signal indicative of an envelope of the electric echo signal; determining (220) a portion of the envelope signal based on at least one operative parameter (OPK), said at least one operative parameter being determined according to Particle Swarm Optimization; processing (225) the portion of the envelope signal and the noise power of the electric echo signal according to an Unscented Kalman Filter to obtain an estimate of the envelope signal, wherein the estimate of the envelope signal is a regenerated version of the envelope signal being regenerated from the portion of the envelope signal, said processing being based on at least one Unscented Kalman Filter parameter (UKFPK) determined according to the Particle Swarm Optimization, and providing (230) said estimate of the time-of-flight according to the estimate of the envelope signal.

Method (200A; 200B) may further include determining (235A; 235B) an estimate error, wherein the Particle Swarm Optimization is based on said estimate error.

Said determining (235A; 235B) an estimate error may include determining (235B) a difference between the estimate of envelope signal and the envelope signal.

Method (200A; 200B) may further include, based on said estimate of the time-of-flight, determining (230) a distance estimate indicative of a distance between the target object (T) and the device (100), wherein said determining (235A; 235B) an estimate error comprises determining (235A) a difference between the distance estimate and said distance.

Said determining (215) an envelope signal may include performing a Hilbert transformation on the electric echo signal.

The portion of the envelope signal may be centered about a maximum value of the envelope signal.

Said processing (225) the operative portion of the envelope signal may include providing a regenerated envelope signal.

Said at least one operative parameter (OPK) may include at least one among operative parameters indicative of a maximum length of the portion of the envelope signal over time, and operative parameters indicative of an optimized length of the portion of the envelope signal over time, the optimized length being lower than the maximum length.

Said at least one Unscented Kalman Filter parameter (UKFPK) may include at least one among an evaluation parameter providing a rough estimate of the time-of-flight; a control parameter for controlling the spread of sigma points around a mean state value, and a correction parameter providing a correction on the noise power of the electric echo signal.

Device (100) for providing an estimate of a time-of-flight between an ultrasonic signal emitted by the device and an ultrasonic echo signal returned by a target object (T) hit by the ultrasonic signal and received at the device, the device may be summarized as including a conditioning and conversion system (105) for acquiring the ultrasonic echo signal thereby obtaining an electric echo signal; a module (115) for determining a noise power of the electric echo signal; a module (120) for determining an envelope signal indicative of an envelope of the electric echo signal; a module (125) for determining a portion of the envelope signal based on at least one operative parameter (OPK), said at least one operative parameter being determined according to Particle Swarm Optimization; a module (130) for processing the portion of the envelope signal and the noise power of the echo ultrasonic signal according to an Unscented Kalman Filter to obtain an estimate of the envelope signal, wherein the estimate of the envelope signal is a regenerated version of the envelope signal being regenerated from the portion of the envelope signal, said processing being based on at least one Unscented Kalman Filter parameter (UKFPK) determined according to the Particle Swarm Optimization, and a module (135) for providing said estimate of the time-of-flight according to the estimate of the envelope signal.

The various embodiments described above can be combined to provide further embodiments. Aspects of the embodiments can be modified, if necessary, to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for providing an estimate of a time-of-flight between an ultrasonic signal emitted by a device and an ultrasonic echo signal returned from a target object hit by the ultrasonic signal and received at the device, the method comprising:
    acquiring the ultrasonic echo signal;
    obtaining an electric echo signal based on the ultrasonic echo signal;
    determining a noise power of the electric echo signal;
    determining an envelope signal indicative of an envelope of the electric echo signal;
    determining at least one operative parameter of the envelope signal based on Particle Swarm Optimization;
    determining a portion of the envelope signal based on the at least one operative parameter;
    determining at least one Unscented Kalman Filter parameter of an Unscented Kalman Filter according to Particle Swarm Optimization;
    processing the portion of the envelope signal and the noise power of the electric echo signal according to the Unscented Kalman Filter to obtain an estimate of the envelope signal, the estimate of the envelope signal being a regenerated version of the envelope signal based on the portion of the envelope signal; and
    providing the estimate of the time-of-flight according to the estimate of the envelope signal.

2. The method according to claim 1, further comprising:
    determining an estimate error between the estimate of the envelope signal and the envelope signal; and
    determining the Particle Swarm Optimization based on the estimate error.

3. The method according to claim 2, wherein the determining of an estimate error comprises determining a difference between the estimate of envelope signal and the envelope signal.

4. The method according to claim 2, further comprising, based on the estimate of the time-of-flight, determining a distance estimate indicative of a distance between the target object and the device, wherein the determining of an estimate error comprises determining a difference between the distance estimate and the distance.

5. The method according to claim 1, wherein the determining of the envelope signal comprises performing a Hilbert transformation on the electric echo signal.

6. The method according to claim 1, wherein the portion of the envelope signal is centered about a maximum value of the envelope signal.

7. The method according to claim 1, wherein the processing of the portion of the envelope signal comprises providing a regenerated envelope signal.

8. The method according to claim 1, wherein the at least one operative parameter comprises at least one among:
    a first and a second operative parameter indicative of a maximum length of the portion of the envelope signal over time, or
    a third and a fourth operative parameter indicative of an optimized length of the portion of the envelope signal over time, the optimized length being lower than the maximum length.

9. The method according to claim 8, wherein said determining of the portion of the envelope signal comprises:
    calculating a maximum value of the envelope signal and a corresponding first temporal position at which the envelope signal has the maximum value;
    calculating, as a function of the first and second operative parameters and of the maximum value of the envelope signal, a first and, respectively, a second threshold value of the envelope signal, the first and the second threshold values being lower than the maximum value of the envelope signal; and
    determining a second temporal position of the envelope signal at which the value of the envelope signal is equal to the first threshold value, and a third temporal position of the envelope signal at which the value of the envelope signal is equal to the second threshold value, the second temporal position being lower than the first temporal position and the third temporal position being greater than the first temporal position.

10. The method according to claim 9, wherein said portion of the envelope signal is defined between the second temporal position and the third temporal position.

11. The method according to claim 9, wherein said determining of the portion of the envelope signal further comprises calculating a fourth temporal position as a function of the third operative parameter and of the second temporal position, and a fifth temporal position as a function of the fourth operative parameter and of the third temporal position, the fourth temporal position being greater than the second temporal position and lower than the first temporal position and the fifth temporal position being greater than the first temporal position and lower than the third temporal position, and
    wherein said portion of the envelope signal is defined between the fourth temporal position and the fifth temporal position.

12. The method according to claim 1, wherein the at least one Unscented Kalman Filter parameter comprises at least one among:
    an evaluation parameter providing a rough estimate of the time-of-flight;
    a control parameter for controlling spread of sigma points around a mean state value; and
    a correction parameter providing a correction on the noise power of the electric echo signal.

13. A device for providing an estimate of a time-of-flight between an ultrasonic signal emitted by the device and an ultrasonic echo signal returned by a target object hit by the ultrasonic signal and received at the device, the device comprising:
    a conditioning and conversion system for acquiring the ultrasonic echo signal and obtaining an electric echo signal based on the ultrasonic echo signal;
    circuitry for determining a noise power of the electric echo signal;
    circuitry for determining an envelope signal indicative of an envelope of the electric echo signal;
    circuitry for determining a portion of the envelope signal based on at least one operative parameter of the envelope signal, the at least one operative parameter being determined according to Particle Swarm Optimization;
    circuitry for obtaining an estimate of the envelope signal by processing the portion of the envelope signal and the noise power of the echo ultrasonic signal according to an Unscented Kalman Filter, the estimate of the envelope signal being a regenerated version of the envelope signal based on the portion of the envelope signal and at least one Unscented Kalman Filter parameter determined according to the Particle Swarm Optimization; and circuitry for providing the estimate of the time-of-flight according to the estimate of the envelope signal.

14. The device according to claim 13, further comprising:
circuitry for determining an estimate error between the estimate of the envelope signal and the envelope signal; and circuitry for determining the Particle Swarm Optimization based on the estimate error.

15. A method, comprising:
obtaining an electric echo signal representing a time-of-flight signal from a device and reflected back from an object;

determining a noise power of the electric echo signal;

generating a first envelope signal indicative of an envelope of the electric echo signal;

determining a portion of the first envelope signal;

generating a second envelope signal based on the portion of the first envelope signal and the noise power of the electric echo signal using an Unscented Kalman Filter; and calculating a travel time of the time-of-flight signal based on the second envelope signal, determining an operative parameter of the first envelope signal based on Particle Swarm Optimization, wherein the determining of the portion of the first envelope signal includes determining the portion of the first envelope signal based on the operative parameter.

16. The method of claim 15, comprising determining a parameter of the Unscented Kalman Filter based on Particle Swarm Optimization.

17. The method according to claim 15, comprising:
determining an estimated distance indicative of a distance between the object and the device based on the travel time; and determining a difference between the estimated distance and the distance.

18. The method according to claim 15 wherein the determining of the first envelope signal includes performing a Hilbert transformation on the electric echo signal.

19. The method according to claim 15 wherein the determining of the portion of the first envelope signal includes determining the portion of the first envelope signal that is centered at a maximum value of the first envelope signal.

* * * * *